(12) United States Patent
Xiong

(10) Patent No.: US 7,586,346 B2
(45) Date of Patent: Sep. 8, 2009

(54) POWER GOOD SIGNAL GENERATING CIRCUIT

(75) Inventor: Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 88 days.

(21) Appl. No.: 11/954,236

(22) Filed: Dec. 12, 2007

(65) Prior Publication Data
US 2009/0106574 A1     Apr. 23, 2009

(30) Foreign Application Priority Data
Oct. 19, 2007     (CN) .................. 2007 1 0202141

(51) Int. Cl.
*H03L 7/00*     (2006.01)
(52) U.S. Cl. ...................... 327/143; 327/198
(58) Field of Classification Search .................. 327/143, 327/198
See application file for complete search history.

(56) References Cited

U.S. PATENT DOCUMENTS

| 4,520,418 | A  | * | 5/1985 | Susi ............................ 361/92 |
| 6,356,130 | B1 | * | 3/2002 | Lee ............................. 327/198 |
| 7,205,808 | B2 | * | 4/2007 | You et al. .................... 327/198 |
| 7,298,186 | B2 | * | 11/2007 | Huang et al. ................. 327/143 |
| 7,378,896 | B2 | * | 5/2008 | Wong et al. .................. 327/333 |
| 7,400,188 | B2 | * | 7/2008 | Huang et al. ................. 327/543 |
| 7,403,050 | B2 | * | 7/2008 | Jiang et al. ................... 327/143 |

* cited by examiner

*Primary Examiner*—Tuan Lam
(74) *Attorney, Agent, or Firm*—Frank R. Niranjan

(57) ABSTRACT

A power good signal generating circuit includes a first resistor and a capacitor, a system power is grounded via the first transistor and the capacitor in sequence; a first transistor, the base of the first transistor is for receiving a PS_ON signal from the motherboard, the collector of the first transistor is connected to a node between the first transistor and the capacitor; a second transistor, the gate of the second transistor is connected to the collector of the first transistor, the drain of the second transistor is connected to a standby power; and a third transistor, the base of the third transistor is connected to the drain of the second transistor, the collector of the third transistor is connected to the system power, for outputting a PWR_GOOD signal.

11 Claims, 1 Drawing Sheet

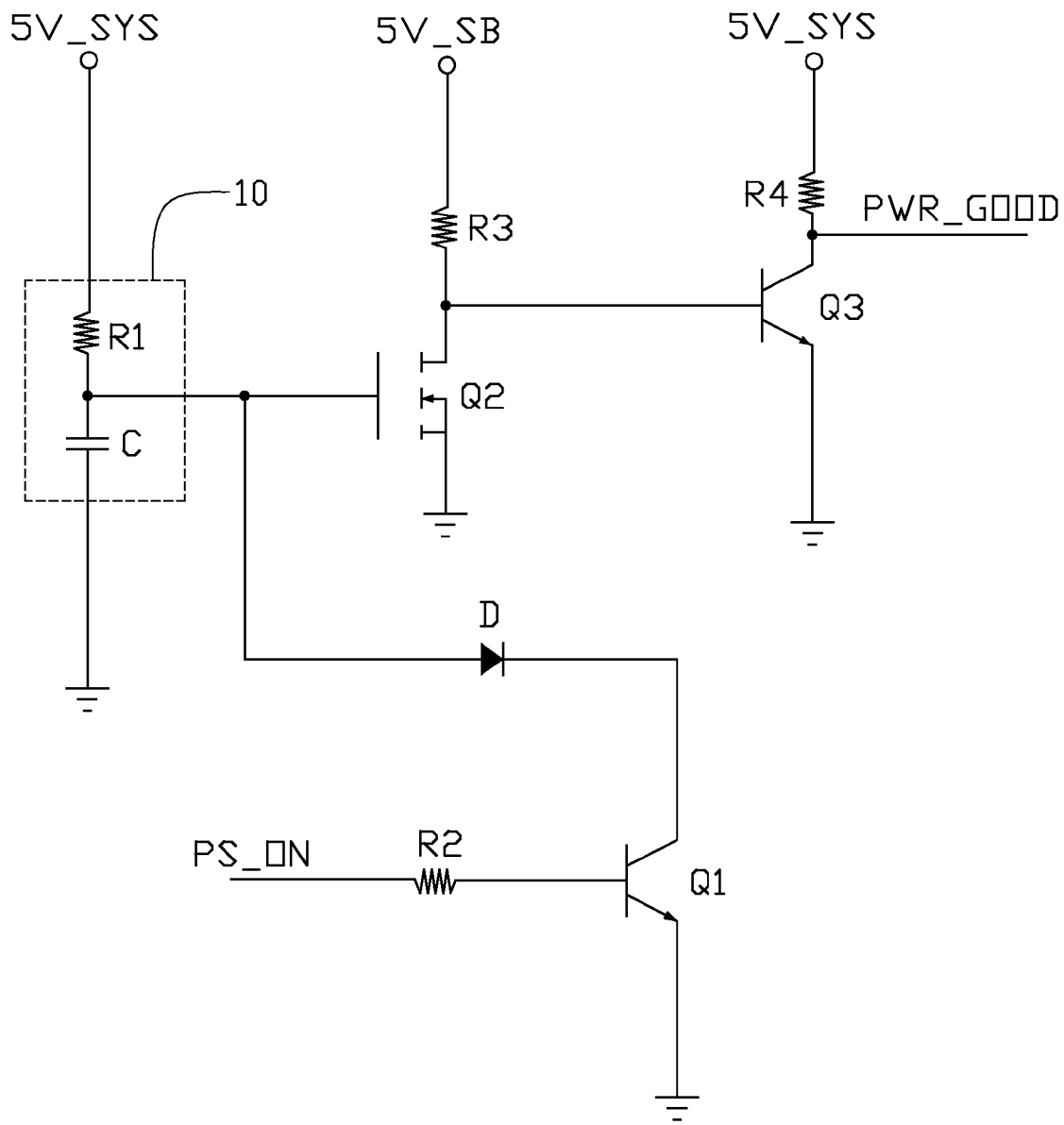

POWER GOOD SIGNAL GENERATING CIRCUIT

BACKGROUND OF THE INVENTION

1. Field of the Invention

The present invention relates to a power good signal generating circuit for a motherboard.

2. Description of Related Art

PS_ON (power supply on) is an active-low, TTL-compatible signal that allows a motherboard to remotely control the power supply in conjunction with features such as soft on/off. When PS_ON is pulled to TTL low, the power supply should turn on full power. When PS_ON is at a TTL high level, the power supply turns off all of the voltages except the 5-volt standby voltage (5V_SB). Once the power supply voltages are stable, the power supply will signal that fact to the motherboard with the PWR_GOOD (power good) signal. When the PWR_GOOD signal is at a TTL high level, the motherboard should start operating.

According to the ATX (Advanced Technology Extended) standard, the power-on time which is defined as the time from when PS_ON is pulled TTL low to when the motherboard receives the PWR_GOOD signal must be from 100 ms-500 ms. Otherwise, the motherboard does not start.

What is needed, therefore, is a power good signal generating circuit which can solve the above the problem.

SUMMARY

An exemplary power good signal generating circuit includes a first resistor and a capacitor, a system power is grounded via the first transistor and the capacitor in sequence; a first transistor, the base of the first transistor is for receiving a PS_ON signal from the motherboard, the collector of the first transistor is connected to a node between the first transistor and the capacitor, the emitter of the first transistor is grounded; a second transistor, the gate of the second transistor is connected to the collector of the first transistor, the drain of the second transistor is connected to a standby power, the source of the second transistor is grounded; and a third transistor, the base of the third transistor is connected to the drain of the second transistor, the collector of the third transistor is connected to the system power, for outputting a PWR_GOOD signal, the emitter of the third transistor is grounded.

Other advantages and novel features will become more apparent from the following detailed description when taken in conjunction with the accompanying drawing, in which:

BRIEF DESCRIPTION OF THE DRAWINGS

The drawing is a circuit diagram of one embodiment of a power good signal generating circuit in accordance with the present invention.

DETAILED DESCRIPTION

Referring to the drawing, a power good signal generating circuit in accordance with an embodiment of the present invention includes a first transistor Q1, a second transistor Q2, a third transistor Q3, a charge circuit 10, and a diode D. The charge circuit 10 includes a first resistor R1 and a capacitor C connected in series. In this embodiment, the first transistor Q1 is a PNP transistor, the first transistor Q2 is an NMOS transistor, the third transistor Q3 is a PNP transistor.

A 5V system power 5V_SYS of the motherboard is grounded via the first resistor R1 and the capacitor C in sequence. The collector of the transistor Q1 is connected to the cathode of the diode D. The anode of the diode D is connected to a node between the first resistor R1 and the capacitor C. The emitter of the first transistor Q1 is grounded. The base of the first transistor Q1 acts as an input of the power good signal generating circuit to receive a PS_ON signal via a second resistor R2. The gate of the second transistor Q2 is connected to the anode of the diode D. The source of the second transistor Q2 is grounded. The drain of the second transistor Q2 is connected to a 5V standby power 5V_SB of the motherboard via a third resistor R3, and also connected to the base of the third transistor Q3. The emitter of the third transistor Q3 is grounded. The collector of the third transistor Q3 acts as an output of the power good signal generating circuit to output the PWR_GOOD signal, and also connected to the 5V system power 5V_SYS via a fourth resistor R4.

At the instant the ATX power is turned on, the PS_ON signal is at a TTL low level. The first transistor Q1 is turned off. The capacitor C is charged by the 5V system power 5V_SYS. When the capacitor C is charged to a threshold voltage of the second transistor Q2, the second transistor Q2 is turned on. The drain of the second transistor Q2 outputs a low level voltage. The third transistor Q3 is turned off. So the power good signal generating circuit outputs the PWR_GOOD signal to the motherboard. Thus the motherboard starts to work. The power-on time, which is defined as the time from when PS_ON signal is at a TTL low level to when the motherboard receives the PWR_GOOD signal, is equal to the charge time of the capacitor C when it is charged to the threshold voltage of the second transistor Q2. By adjusting the parameter of the first resistor R1 and the capacitor C, the power-on time can be controlled to be in the 100-500 ms range.

When the motherboard is in a standby mode, the PS_ON signal is at a TTL high level. The ATX power supply turns off all of the voltages except the 5V standby voltage 5V_SB. The first transistor Q1 is turned on. The capacitor C is discharged via the diode D. The second transistor Q2 is turned off because the gate of the second transistor Q2 is at a low TTL level. The third transistor Q3 is turned on because the drain of the second transistor Q2 is at a high TTL level. So the power good signal generating circuit outputs a low level voltage.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternately embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A power good signal generating circuit for a motherboard, comprising:

a charge circuit comprising a first resistor and a capacitor, a system power being grounded via a first transistor and the capacitor in sequence;

the first transistor, the base of the first transistor receiving a PS_ON signal from the motherboard, the collector of the first transistor connected to a node between the first resistor and the capacitor, the emitter of the first transistor being grounded;

a second transistor, the gate of the second transistor connected to the collector of the first transistor, the drain of the second transistor connected to a standby power, the source of the second transistor being grounded; and a third transistor, the base of the third transistor connected to the drain of the second transistor, the collector of the third transistor connected to the system power, for outputting a PWR_GOOD signal, the emitter of the third transistor being grounded.

2. The power good generating circuit as claimed in claim 1, further comprising a diode, the anode of the diode connected to the gate of the second transistor, the cathode of the diode connected to the collector of the first transistor.

3. The power good generating circuit as claimed in claim 1, wherein the base of the first transistor receives the PS_ON signal from the motherboard via a second resistor.

4. The power good generating circuit as claimed in claim 1, wherein the drain of the second transistor is connected to the standby power via a third resistor.

5. The power good generating circuit as claimed in claim 1, wherein the collector of the third transistor is connected to the system power via a fourth resistor.

6. The power good generating circuit as claimed in claim 1, wherein the first transistor is a PNP transistor.

7. The power good generating circuit as claimed in claim 1, wherein the second transistor is an NMOS transistor.

8. The power good generating circuit as claimed in claim 1, wherein the third transistor is a PNP transistor.

9. The power good generating circuit as claimed in claim 1, wherein the system power is 5 volts.

10. The power good generating circuit as claimed in claim 1, wherein the standby power is 5 volts.

11. The power good generating circuit as claimed in claim 1, wherein a time parameter of the charge circuit is ranged from 100 ms to 500 ms.

* * * * *